United States Patent
Morrell et al.

(10) Patent No.: US 11,090,733 B2
(45) Date of Patent: Aug. 17, 2021

(54) INTEGRATED DRILL CHUCK

(71) Applicant: Royal Hydraulics Service and Manufacturing Company, Inc., Cokeburg, PA (US)

(72) Inventors: George Morrell, Cokeburg, PA (US); Mark Crable, Adah, PA (US)

(73) Assignee: Royal Hydraulics Service and Manufacturing Company, Inc., Cokesburg, PA (US)

(*) Notice: Subject to any disclaimer, the term of this patent is extended or adjusted under 35 U.S.C. 154(b) by 0 days.

(21) Appl. No.: 16/150,793

(22) Filed: Oct. 3, 2018

(65) Prior Publication Data

US 2019/0099813 A1 Apr. 4, 2019

Related U.S. Application Data

(60) Provisional application No. 62/567,493, filed on Oct. 3, 2017.

(51) Int. Cl.
*B23B 31/10* (2006.01)
*E21D 20/00* (2006.01)
*B23B 31/00* (2006.01)
*E21D 21/00* (2006.01)

(52) U.S. Cl.
CPC ............ *B23B 31/10* (2013.01); *B23B 31/008* (2013.01); *E21D 20/003* (2013.01); *B23B 2231/0228* (2013.01); *B23B 2231/0232* (2013.01); *B23B 2265/322* (2013.01); *B23B 2265/326* (2013.01); *B23B 2270/62* (2013.01); *E21D 21/0026* (2013.01)

(58) Field of Classification Search
CPC ....... E21B 17/03; E21B 17/04; E21D 20/003; E21D 21/0026; Y10T 279/17008; B23B 31/10; B23B 2231/0228; B23B 2231/0232
See application file for complete search history.

(56) References Cited

U.S. PATENT DOCUMENTS

| | | | |
|---|---|---|---|
| 2,139,421 A | 9/1937 | Rineer | |
| 2,939,197 A | 6/1960 | Leven | |
| 4,834,594 A * | 5/1989 | Morgan | ................... E21B 3/02 |
| | | | 175/320 |
| 4,856,384 A | 8/1989 | Wechner | |
| 5,325,931 A | 7/1994 | Woods | |
| 6,182,776 B1 | 2/2001 | Asberg | |
| 6,367,567 B1 | 4/2002 | Massa et al. | |
| 8,302,708 B1 * | 11/2012 | Cox | ........................ E21B 17/03 |
| | | | 175/300 |
| 2004/0238223 A1 | 12/2004 | Brady | |
| 2007/0098505 A1 | 5/2007 | Hinshaw et al. | |
| 2013/0112481 A1* | 5/2013 | Wang | ...................... E21B 17/03 |
| | | | 175/57 |
| 2016/0362943 A1 | 12/2016 | Malstam et al. | |
| 2018/0073307 A1* | 3/2018 | Galler | ..................... E21B 17/03 |

* cited by examiner

*Primary Examiner* — Carib A Oquendo
(74) *Attorney, Agent, or Firm* — The Webb Law Firm

(57) ABSTRACT

An integrated drill chuck for installing mine roof bolts includes a single integrated piece, the single integrated piece including a body defining a receiving cavity, where the receiving cavity is configured to receive and secure a bit having a square-shaped end and a bit having a hex-shaped end. A drill for installing mine roof bolts is also disclosed. A method for installing mine roof bolts is also disclosed.

18 Claims, 12 Drawing Sheets

INTEGRATED DRILL CHUCK

CROSS-REFERENCE TO RELATED APPLICATIONS

This application claims priority to U.S. Provisional Patent Application No. 62/567,493, filed Oct. 3, 2017, the disclosure of which is hereby incorporated by reference in its entirety.

BACKGROUND OF THE INVENTION

Field of the Invention

The present invention relates to an integrated drill chuck for installing mine roof bolts, a drill for installing mine roof bolts including the integrated drill chuck, and a method of installing mine roof bolts.

Description of Related Art

Installing mine roof bolts in rock formations generally includes at least two steps. The first step includes drilling a hole in the formation for receiving the mine roof bolt. This may be done using a drill bit, such as a rod-like drill bit. Such drill bits typically include a hex-shaped end for insertion into a chuck. The second step includes securing the mine roof bolt to the formation by inserting the mine roof bolt into the hole created by the drill bit. Mine roof bolts typically include a square-shaped end for insertion into a chuck.

Conventional chucks include two separate pieces. The first is an outer hub. The second is an insert with the hex/square drive for receiving the different drill bits, which is inserted into the outer hub. When the drill starts to work, pressure is exerted on the insert, and the insert starts to loosen from the outer hub, and the insert hammers up and down. The hammering causes both the outer hub and the insert to be worn and destroyed prematurely. Therefore, there is a need in the art for a chuck designed to reduce this hammering and extend the life of the chuck.

SUMMARY OF THE INVENTION

The present invention is directed to an integrated drill chuck for installing mine roof bolts including a single integrated piece, the single integrated piece including a body defining a receiving cavity, where the receiving cavity is configured to receive and secure a bit having a square-shaped end and a bit having a hex-shaped end.

The drill chuck may be configured for use in drilling a hole for receiving a mine roof bolt using the bit having the hex-shaped end and installing a mine roof bolt having the square-shaped end, where no separate insert, insertable into the receiving cavity, is required for the drill chuck to receive the square-shaped end and to receive the hex-shaped end. The drill chuck may be configured to co-act with a drill body of a drill for installing mine roof bolts, so as to be disposed in a chuck cavity defined by a drill body of the drill. The drill chuck may be secured in the chuck cavity by at least one bearing and/or at least one seal positioned in the chuck cavity. The at least one bearing may include a thrust bearing and/or a roller bearing or ball bearing. The drill chuck may be rotated in the chuck cavity by a motor. The bit having the hex-shaped end may include aluminium and/or steel.

The present invention is also directed to a drill for installing mine roof bolts including: a drill body including a chuck cavity; and a drill chuck disposed in the chuck cavity including a single integrated piece, the single integrated piece including a body defining a receiving cavity, where the receiving cavity is configured to receive and secure a bit having a square-shaped end and a bit having a hex-shaped end.

The drill may include at least one bearing and/or at least one seal positioned in the chuck cavity and configured to secure the drill chuck in the chuck cavity. The at least one bearing may include a thrust bearing and/or a roller bearing or ball bearing. The drill may include a motor to rotate the drill chuck. The chuck may be configured for use in drilling a hole for receiving a mine roof bolt using the bit having the hex-shaped end and installing a mine roof bolt having the square-shaped end, where no separate insert, insertable into the receiving cavity, is required for the drill chuck to receive the square-shaped end and to receive the hex-shaped end. The bit having the hex-shaped end may include aluminium and/or steel.

The present invention is also directed to a method of installing mine roof bolts including: providing a drill chuck including a single integrated piece, the single integrated piece including a body defining a receiving cavity, where the receiving cavity is configured to receive and secure a bit having a square-shaped end and a bit having a hex-shaped end; inserting a drill bit having the hex-shaped end into the receiving cavity; drilling a hole into a formation using the drill bit; removing the drill bit from the receiving cavity; inserting a mine roof bolt having the square-shaped end into the receiving cavity; and installing the mine roof bolt into the formation by inserting the mine roof bolt into the hole.

No separate insert, insertable into the receiving cavity, may be required for the drill chuck to receive the square-shaped end and to receive the hex-shaped end. The drill chuck may be configured to co-act with a drill body of a drill for installing mine roof bolts, so as to be disposed in a chuck cavity defined by a drill body of the drill. The drill chuck may be secured in the chuck cavity by at least one bearing and/or at least one seal positioned in the chuck cavity. The at least one bearing may include a thrust bearing and/or a roller bearing or ball bearing. The drill chuck may be rotated in the chuck cavity by a motor. The bit having the hex-shaped end may include aluminium and/or steel.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE INVENTION

Figure 1:
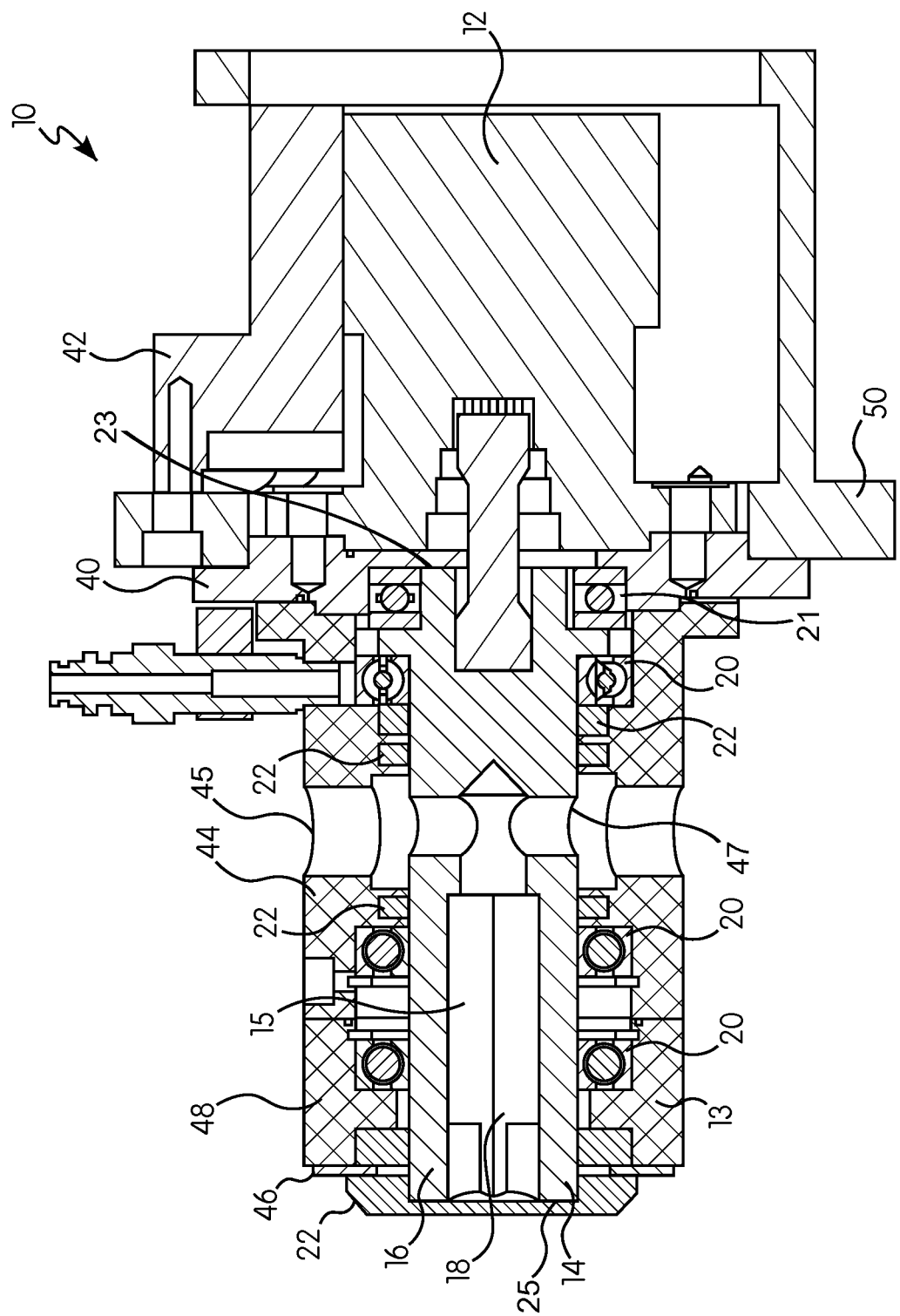
FIG. 1 shows a cross-sectional view of a drill including an integrated drill chuck.

The present invention will now be described with reference to the accompanying figures. For purposes of the description hereinafter, the terms "upper", "lower", "right", "left", "vertical", "horizontal", "top", "bottom", and derivatives thereof, shall relate to the invention as it is oriented in the drawing figures. However, it is to be understood that the invention may assume various alternative variations and step sequences, except where expressly specified to the contrary. It is to be understood that the specific system illustrated in the attached figures and described in the following specification is simply an exemplary embodiment of the present invention. Hence, specific dimensions and other physical characteristics related to the embodiments disclosed herein are not to be considered as limiting.

Figure 2:
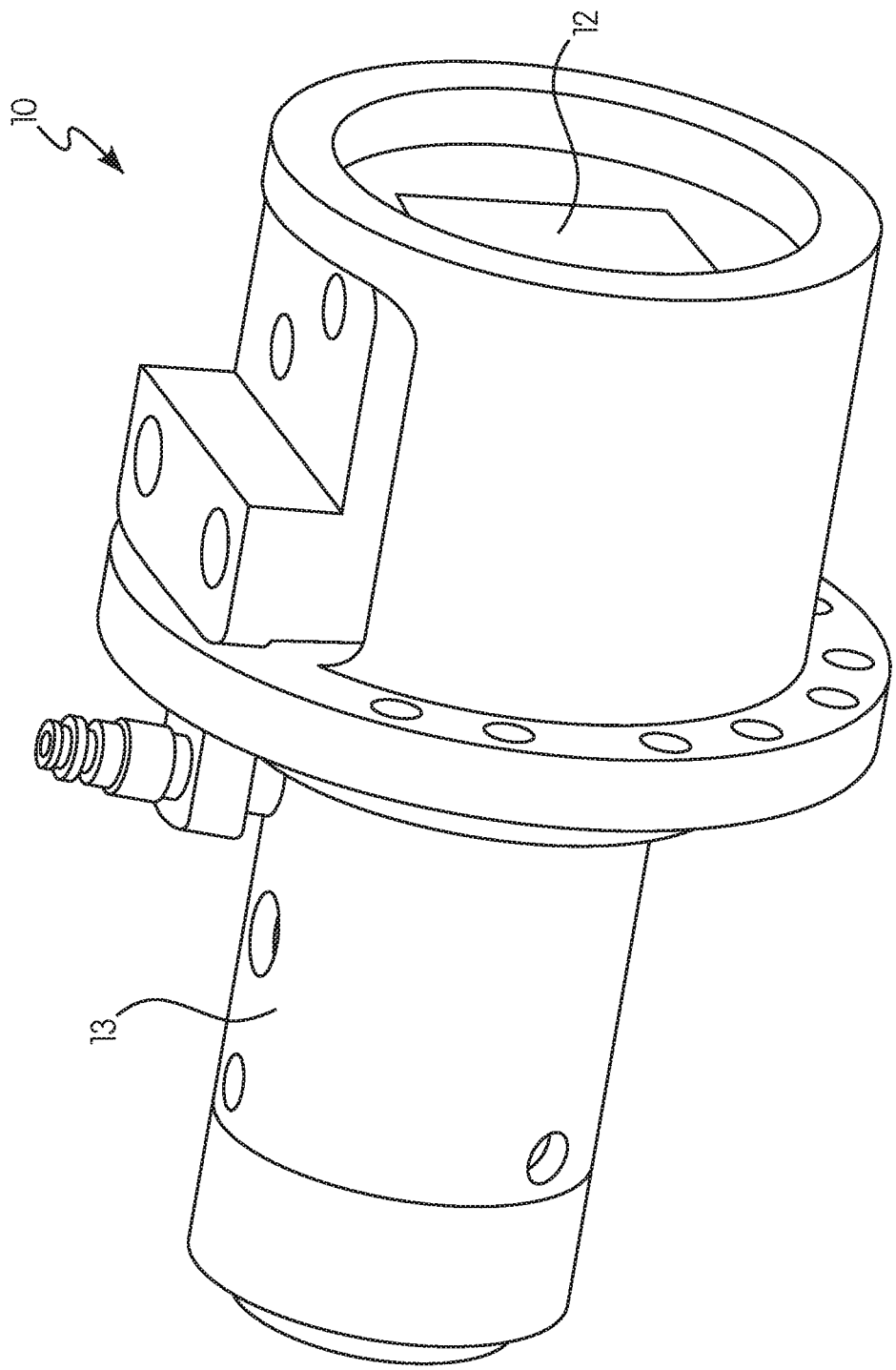
FIG. 2 shows a perspective view of the drill of FIG. 1.

Referring to FIGS. 1 and 2, a drill 10 is shown that may be suitable for installing mine roof bolts. Installing mine roof bolts with the drill 10 may include drilling a hole in a formation, such as a rock formation in a mine, and subsequently inserting a mine roof bolt in the hole in the formation to secure the mine roof bolt to the formation. The drill 10 may include a motor 12. The drill 10 may further include a drill body 13 defining a chuck cavity 15 for receiving a chuck 14. The motor 12 may co-act with the chuck 14 to rotate the chuck 14. The motor 12 may rotate the chuck 14 in either direction depending on whether a bit inserted in the chuck 14 is drilling into the formation or being removed from the formation. The drill 10 may further include at least one roller or ball bearing 20, thrust bearing 21, and/or seal 22. The bearings 20, 21 and seals 22 may be positioned in the drill body 13 and may co-act with a body 16 of the chuck 14. The at least one bearing 20, 21 and/or seal 22 may secure the chuck 14 in the chuck cavity 15. The at least one bearing 20, 21 and/or seal 22 prevent the previously described hammering effect as well. In one embodiment, a thrust bearing 21 may be positioned adjacent the motor 12 and co-act with a portion of the body 16 of the chuck 14 near a proximal end 23 of the chuck 14 and a roller or ball bearing 20 may be positioned in the chuck cavity 15 of the drill body 13 and co-act with the chuck 14 at a portion of the body 16 of the chuck 14 that is closer to a distal end 25 of the chuck 14 than the portion of the body 16 of the chuck 14 which co-acts with the thrust bearing 21.

Figure 3A:
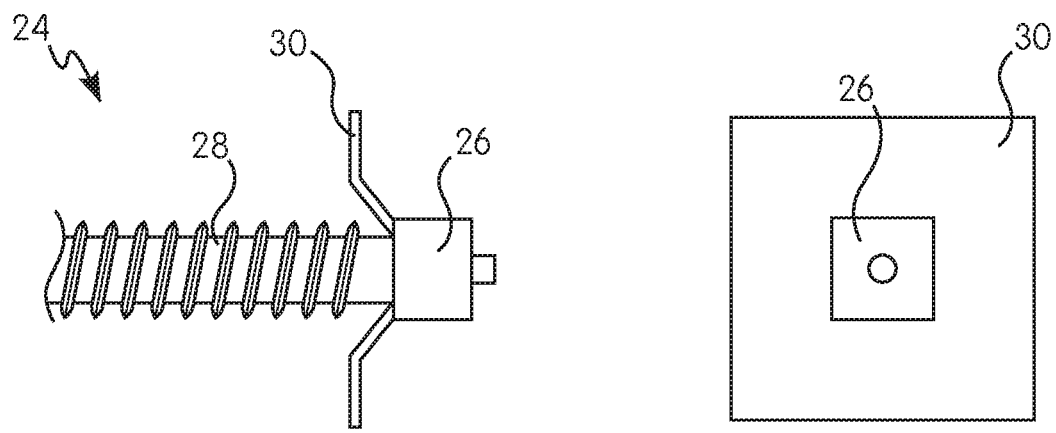
FIG. 3A shows various views of a mine roof bolt.
Figure 3B:
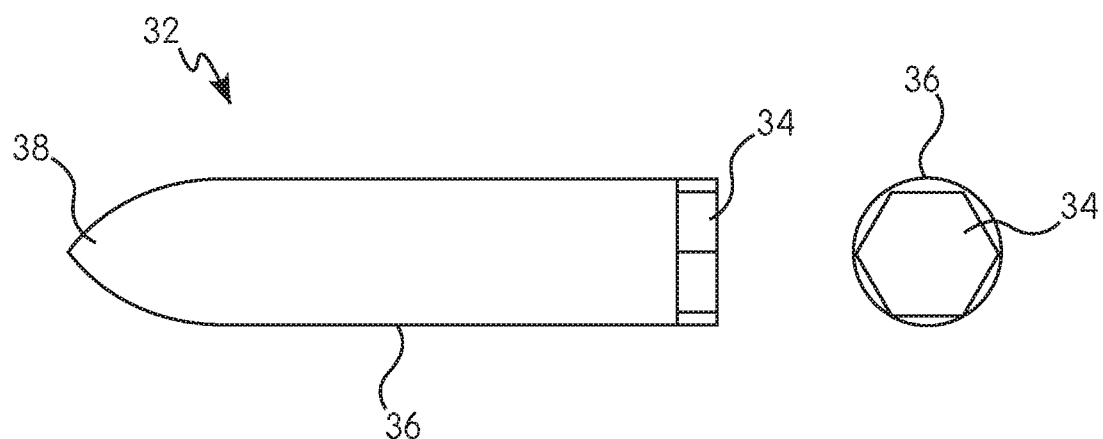
FIG. 3B shows various views of a drill bit.

Referring to FIGS. 3A and 3B, the chuck 14 may be configured to receive bits used with the drill 10. FIG. 3A shows a mine roof bolt 24, which may be a bit useable with the drill 10. The mine roof bolt 24 may include a square-shaped end 26 that is inserted into a receiving cavity 18 of the chuck 14 during installation of the mine roof bolt 24. The square shaped end 26 may be connected to a shaft 28 which may be a rod inserted into the hole drilled in the formation. The square-shaped end 26 may also be connected to a plate 30 which may prevent the mine roof bolt 24 from boring any further into the hole in the formation. When installed, the plate 30 may rest against the formation. The mine roof bolt 24 may be made of steel, aluminum, or any other suitable material.

With continued reference to FIG. 3B, the bit may be a drill bit 32 useable with the drill 10 for drilling a hole in the formation. The drill bit 32 may include a hex-shaped end 34 that is inserted into the receiving cavity 18 of the chuck 14 to drill a hole in the formation to receive the mine roof bolt 24. The drill bit 32 may include a shaft 36 connected to the hex-shaped end 34 to drill the hole in the formation. The drill bit 32 may include a boring end 38 opposite the hex-shaped end 34, which drills into the formation. The boring end 38 may be any shape suitable to drill into the formation, such as including at least one point sharp enough to drill into the formation. The drill bit 32 may be made of steel, aluminum, or any other material suitable for drilling into the formation.

Figure 4:
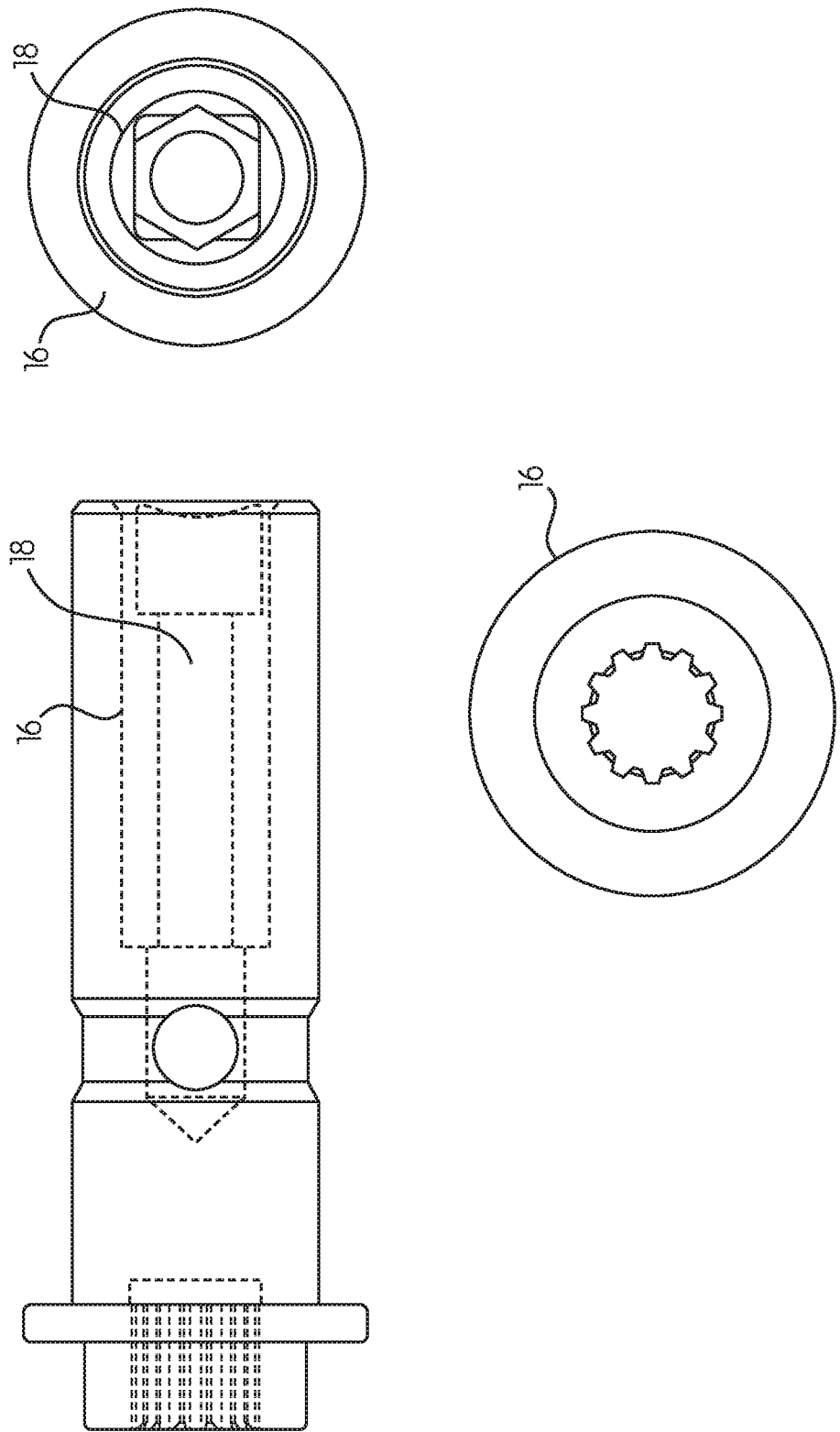
FIG. 4 shows various views of an integrated drill chuck of the drill.

Referring back to FIGS. 1 and 4, the chuck 14 may include a single integrated piece. The single integrated piece of the chuck 14 may not include additional components which are attachable to or detachable from the single integrated piece of the chuck 14. The single integrated piece of the chuck 14 may be the only component of the chuck 14, without any additional components being included. The single integrated piece of the chuck 14 may include the body 16 defining a receiving cavity 18. The receiving cavity 18 may be configured to receive a bit, such as the drill bit 32 for forming a hole in the formation or a mine roof bolt 24 for installation in the formation, as previously described. The receiving cavity 18 may also be configured to secure the drill bit 32 or the mine roof bolt 24 therein so that it remains in the drill 10 during drilling or installation, as applicable. The drill bit 32 or the mine roof bolt 24 may be secured in the receiving cavity 18 using any suitable arrangement.

No separate insert, insertable into the receiving cavity 18, may be required for the chuck 14 to receive both the drill bit 32 and the mine roof bolt 24. The chuck 14 may co-act with the bearings 20, 21 and/or seals 22 positioned in the drill body 13 so as to be secured in the chuck cavity 15.

As previously discussed, conventional drill chucks include two separate pieces: an outer hub and an insert with the hex/square drive inserted into and attachable to/detachable from the outer hub. This two piece design leads to the premature wearing and destruction of the outer hub and the insert because as the drill starts to work, pressure exerted on the insert causes the insert to loosen and hammer up and down against the outer hub. The design of the chuck 14 shown in FIGS. 1 and 4, integrated as a single piece, prevents hammering and premature destruction of the chuck 14. Overall, the integrated chuck 14 is a design that is stronger, more reliable, and more cost effective compared to conventional drill chucks.

Figure 5:
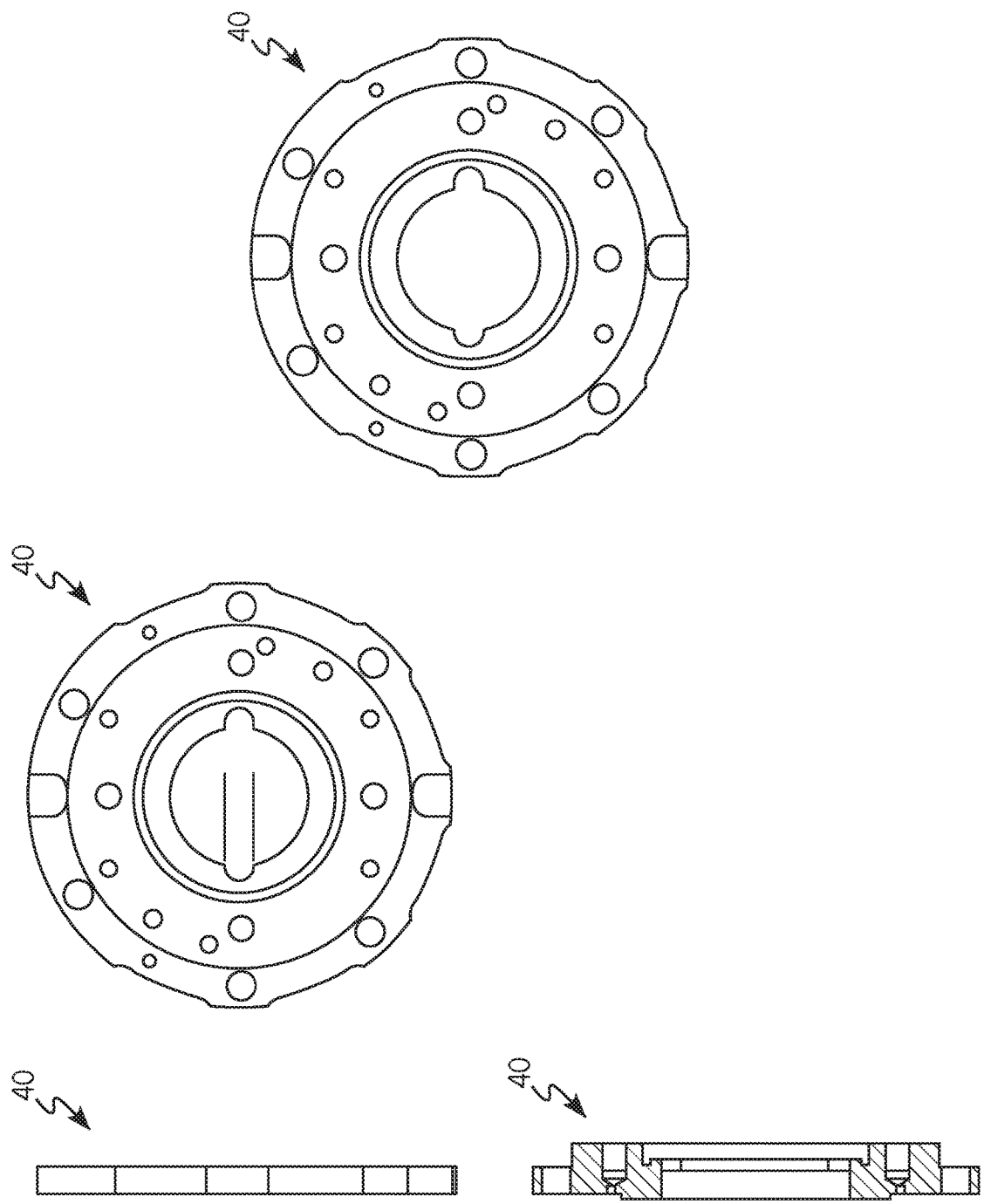
FIG. 5 shows various views of a motor meeting plate of the drill.
Figure 6:
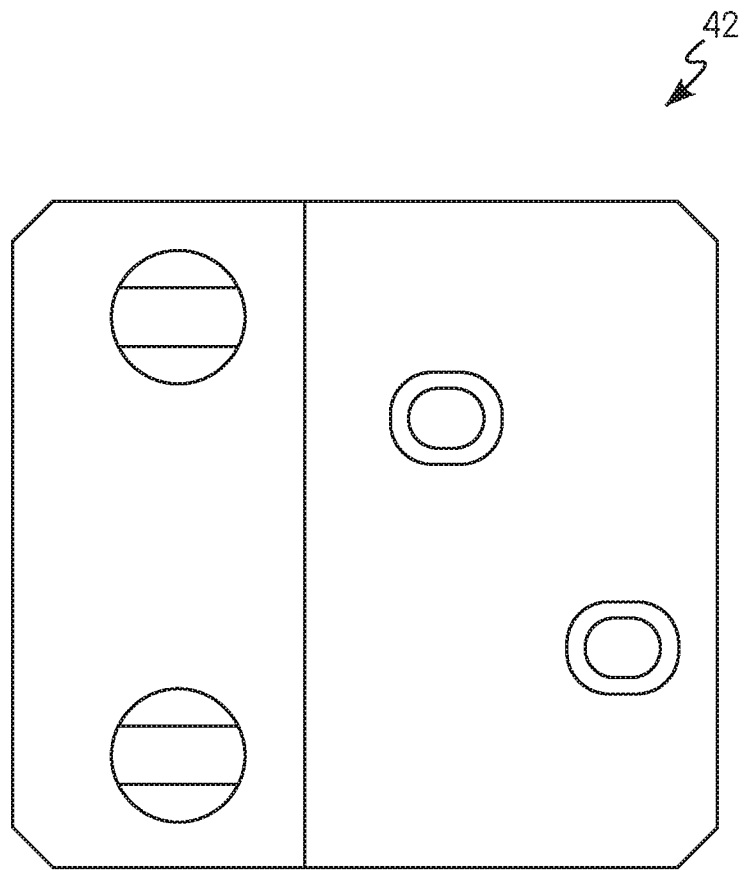
FIG. 6 a view of a fitting block of the drill.
Figure 7:
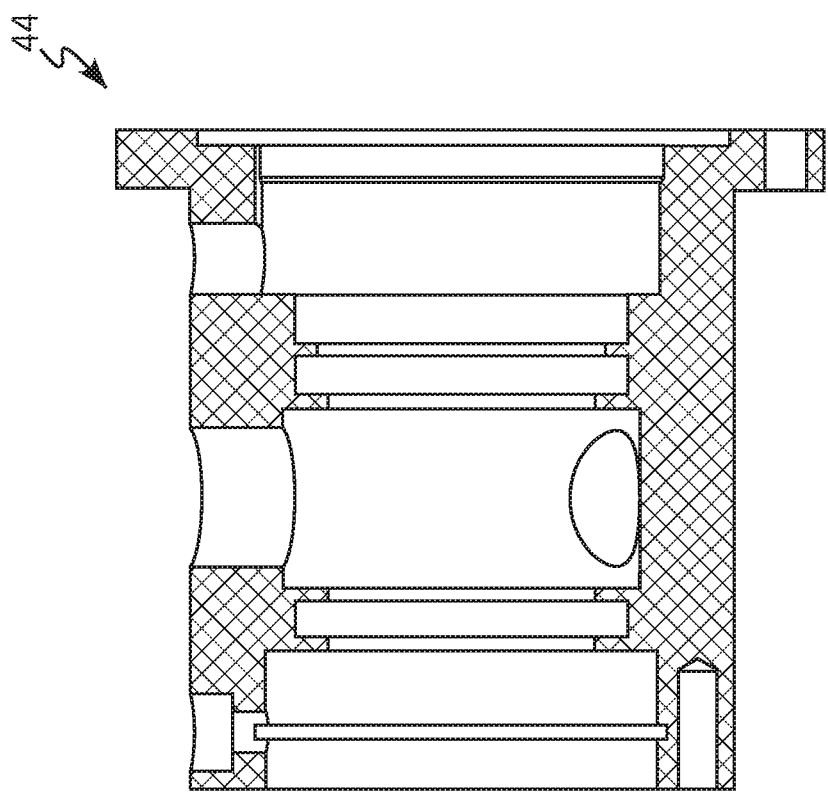
FIG. 7 shows various views of a suction housing of the drill.
Figure 7:
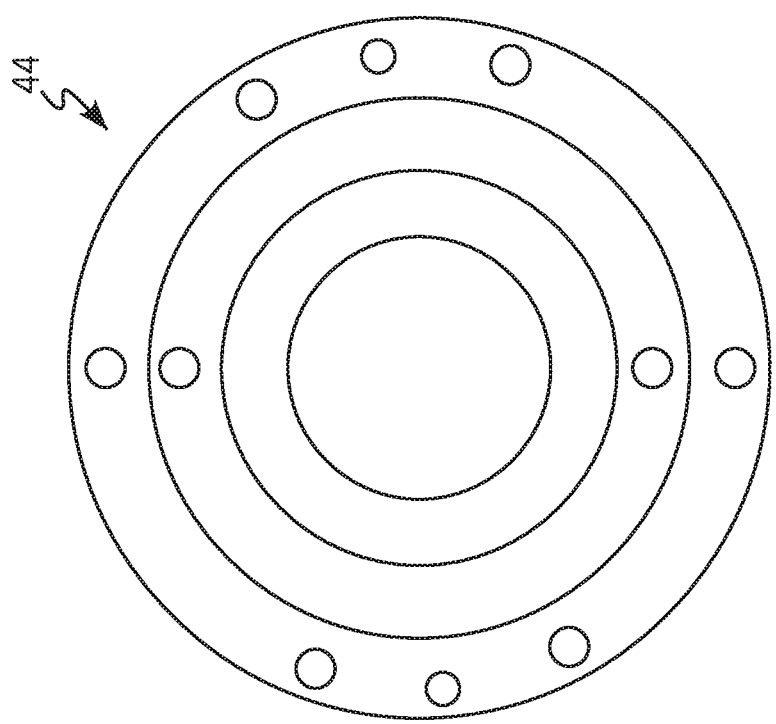
Figure 8:
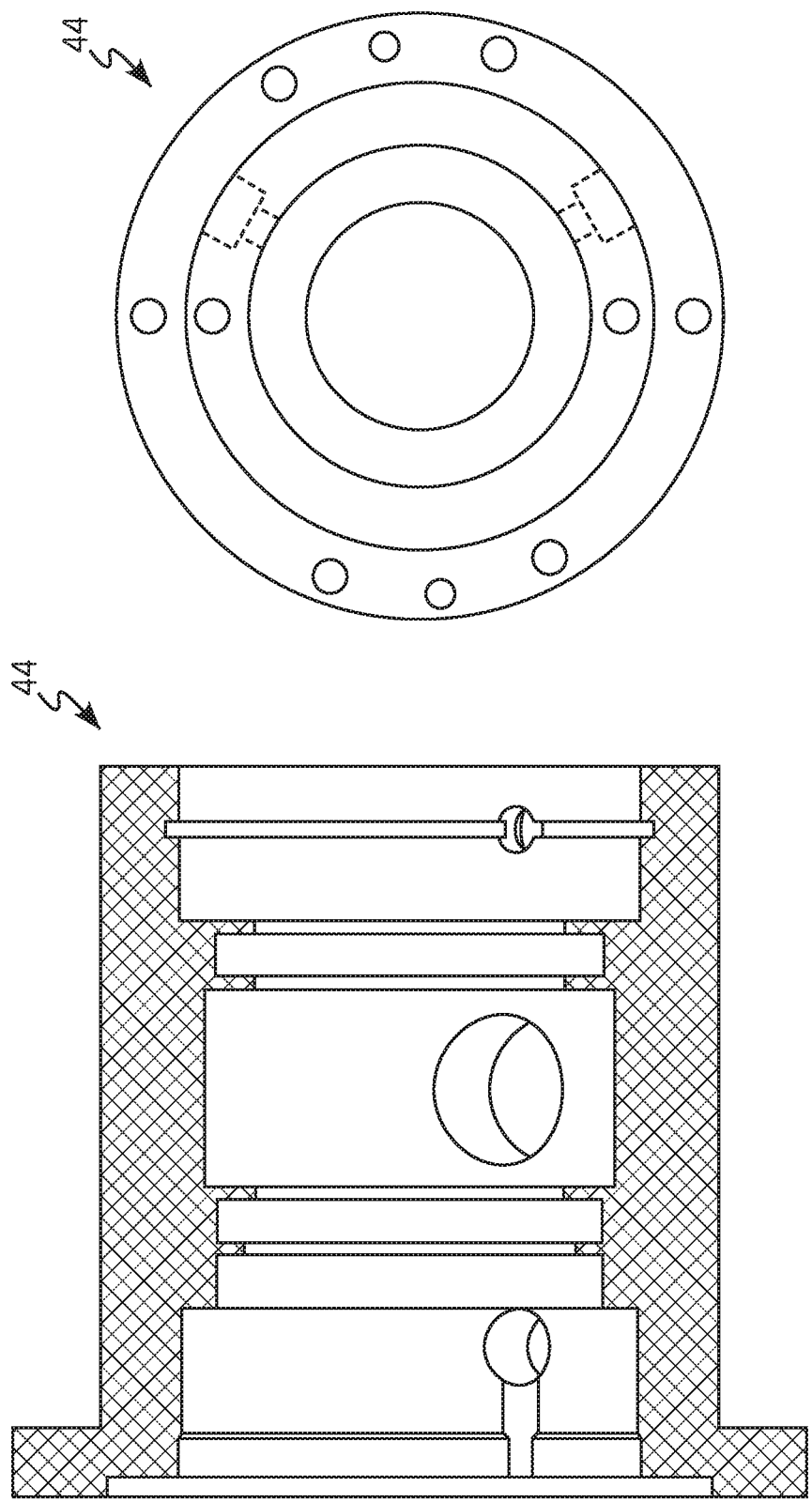
FIG. 8 shows various views of the suction housing of FIG. 7.

Referring to FIG. 5, several views of a motor meeting plate 40 of the drill 10 are shown. The motor meeting plate 40 may be positioned between the drill body 13 and the motor 12. FIG. 6 shows a view of a fitting block 42 of the drill 10, and the fitting block 42 may be connected to the motor 12. FIGS. 7 and 8 show several views of a suction housing 44 of the drill 10, and the suction housing 44 may be a component of the drill body 13. The suction housing 44 may include at least one suction port 45 extending through the suction housing 44 and connecting with chuck cavity 15.

Figure 9:
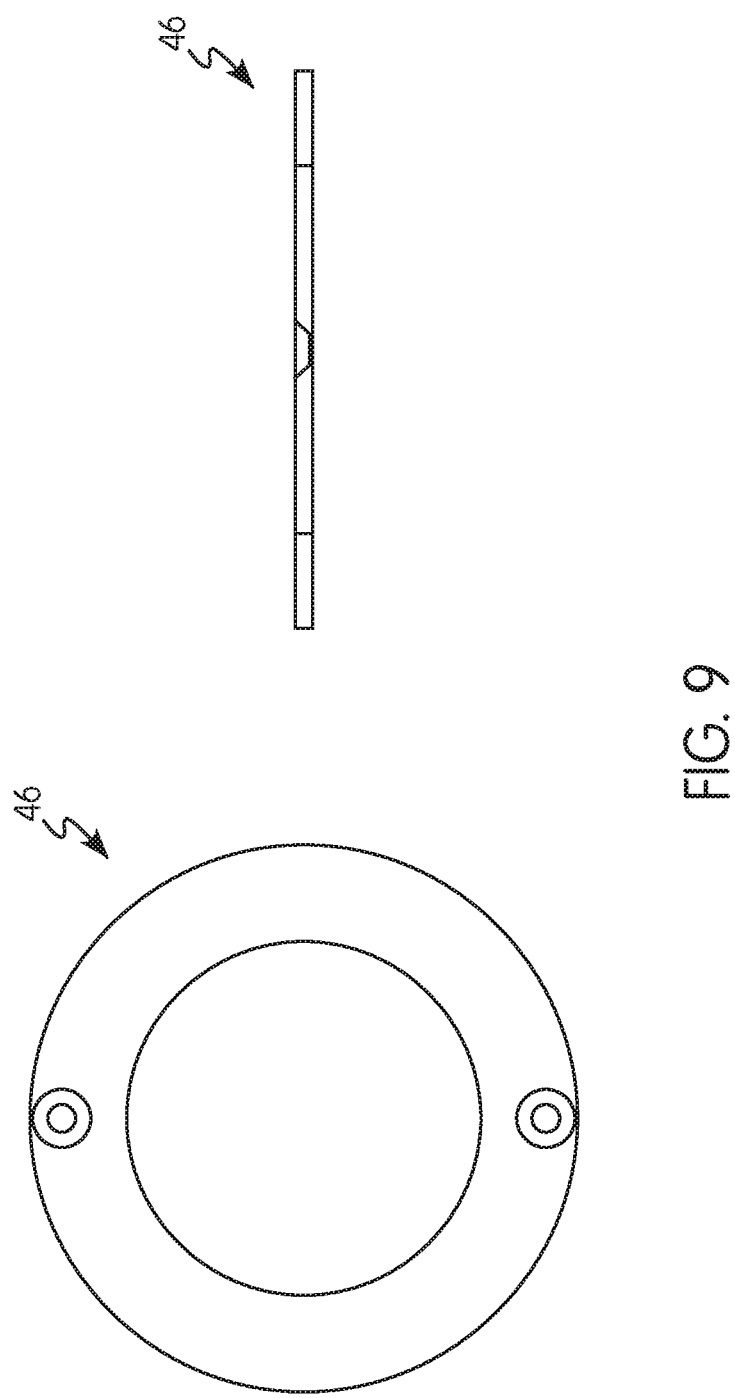
FIG. 9 shows a view of a seal retainer of the drill.
Figure 10:
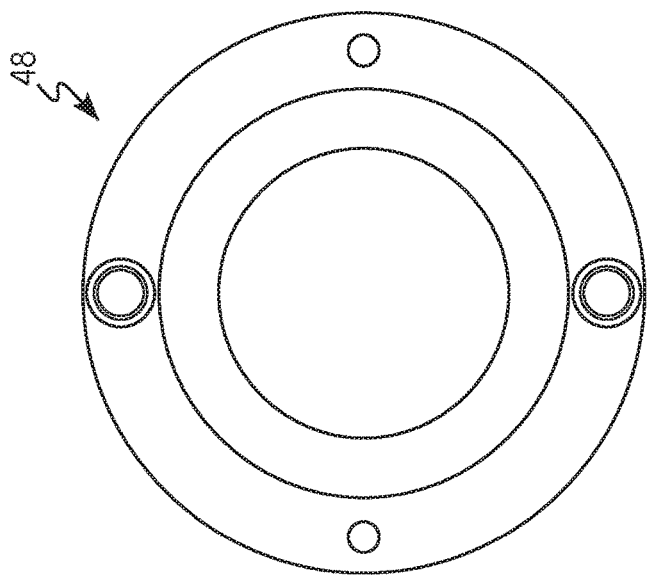
FIG. 10 shows various views of a front housing of the drill.
Figure 10:
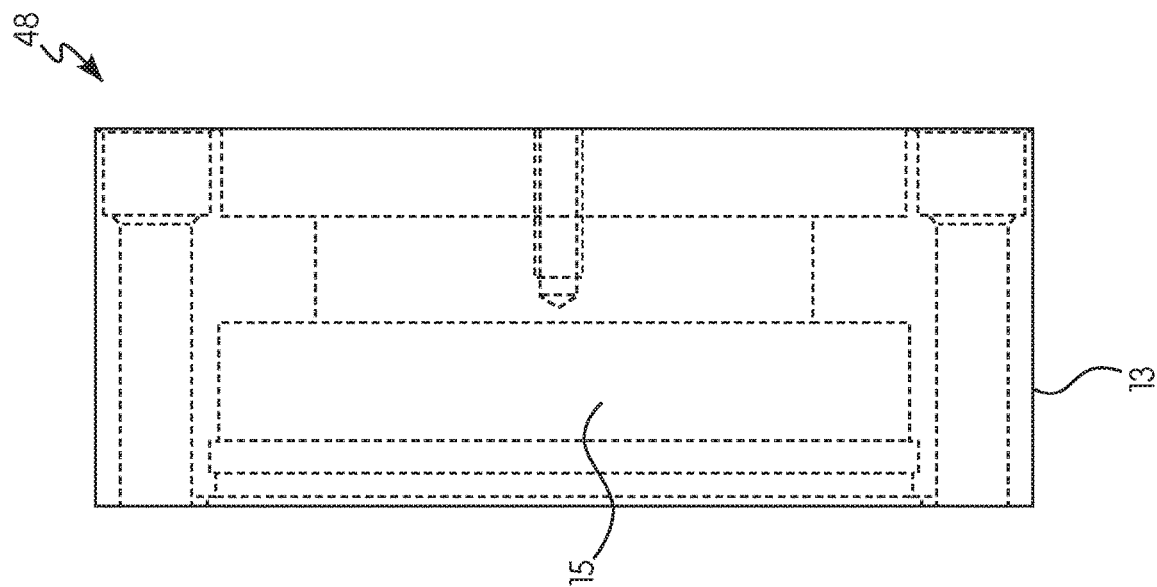
Figure 11:
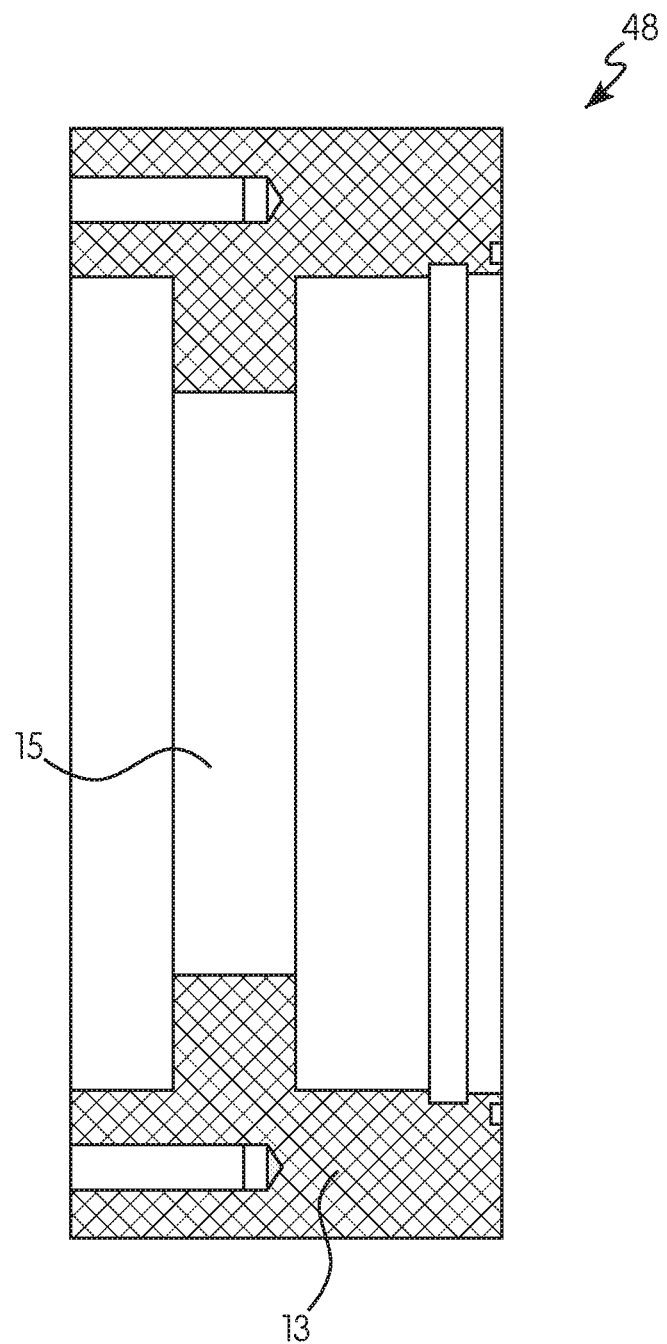
FIG. 11 shows a view of the front housing of FIG. 10.
Figure 12:
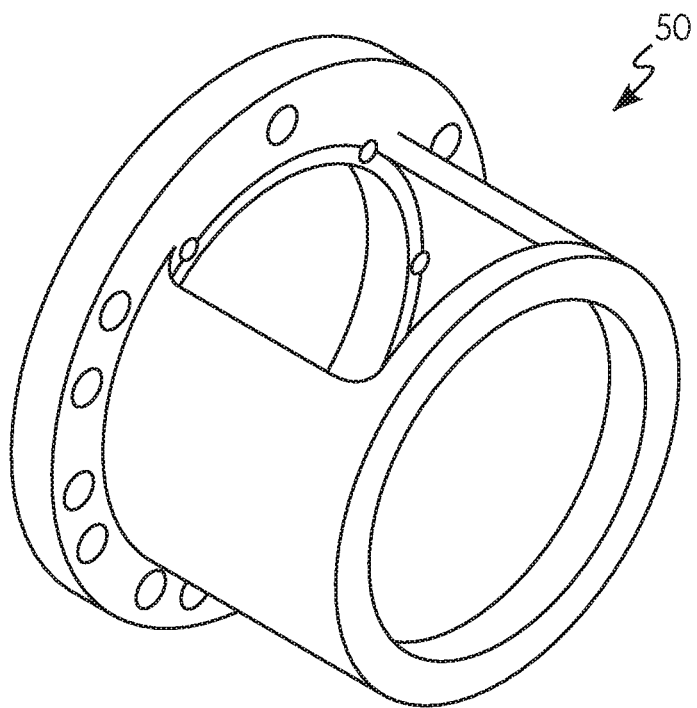
FIG. 12 shows various views of a motor housing of the drill.
Figure 12:
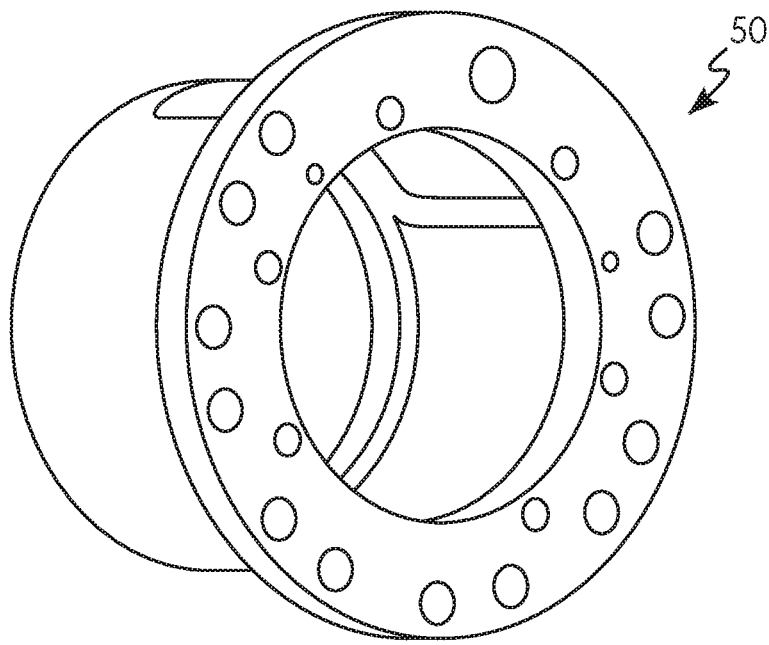

The chuck 14 may include at least one suction opening 47 that extends between the suction port 45 in the suction housing 44 and the receiving cavity 18 of the chuck 14. FIG. 9 shows a view of a seal retainer 46 of the drill 10, which is configured to contain the seal 22 in the chuck cavity 15 of the drill body 13. FIGS. 10 and 11 show several views of a front housing 48 of the drill 10, and the front housing 48 may be a component of the drill body 13. FIG. 12 shows various views of a motor housing 50 of the drill 10. The motor 12 may be contained within the motor housing 50.

The present invention further includes a method for installing mine roof bolts using the drill chuck previously described. In the method, the drill chuck (see FIG. 1) may include the single integrated piece, the single integrated piece including a body defining a receiving cavity, where the receiving cavity is configured to receive and secure a bit having a square-shaped end and a bit having a hex-shaped end. The drill bit (see FIG. 3B) having a hex-shaped end may be inserted into the receiving cavity, and a hole may be drilled into the formation (e.g., a mine roof) using this drill bit. Once this drill bit is removed, the mine roof bolt (see FIG. 3A) having a square-shaped end may be inserted into the receiving cavity of the drill chuck. The mine roof bolt may be inserted into the hole formed by the drill bit using the drill, such that the mine roof bolt is installed into the formation in a secure manner.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A drill for installing mine roof bolts comprising:
   a drill body comprising a chuck cavity; and
   a drill chuck disposed in the chuck cavity comprising a monolithic piece, the monolithic piece comprising a body defining a receiving cavity, wherein at least a portion of the receiving cavity has a square-shaped cross-section for receiving and securing a bit having a square-shaped end and at least a portion of the receiving cavity has a hex-shaped cross-section for receiving and securing a bit having a hex-shaped end; and
   at least one roller or ball bearing positioned in the chuck cavity that engages the drill chuck to secure the drill chuck in the chuck cavity.

2. The drill of claim 1, further comprising at least one seal positioned in the chuck cavity that engages the drill chuck to secure the drill chuck in the chuck cavity.

3. The drill of claim 1, further comprising a thrust bearing.

4. The drill of claim 1, wherein the thrust bearing co-acts with a portion of the chuck near a proximal end of the chuck and the at least one roller or ball bearing co-acts with a portion of the chuck that is closer to a distal end of the chuck than the portion of the chuck which co-acts with the thrust bearing.

5. The drill of claim 1, wherein the drill further comprises a motor, the monolithic piece further comprises an engagement portion for connection to the motor, and the motor rotates the drill chuck in the chuck cavity.

6. The drill of claim 1, wherein no separate insert, insertable into the receiving cavity, is required for the drill chuck to receive the square-shaped end and to receive the hex-shaped end.

7. The drill of claim 1, wherein the bit having the hex-shaped end comprises aluminum and/or steel.

8. The drill of claim 1, further comprising a suction housing including at least one suction port extending through the suction housing and connecting with the chuck cavity.

9. The drill of claim 8, wherein the chuck includes at least one suction opening that extends between the suction port in the suction housing and the receiving cavity.

10. A method of installing mine roof bolts comprising:
    providing a drill comprising a chuck cavity and at least one roller or ball bearing positioned in the chuck cavity;
    inserting a drill chuck comprising a monolithic piece into the chuck cavity such that the at least one roller or ball bearing engages the drill chuck to secure the drill chuck in the chuck cavity, the monolithic piece comprising a body defining a receiving cavity, wherein at least a portion of the receiving cavity has a square-shaped cross-section for receiving and securing a bit having a square-shaped end and at least a portion of the receiving cavity has a hex-shaped cross-section for receiving and securing a bit having a hex-shaped end;
    inserting a drill bit having the hex-shaped end into the receiving cavity;
    drilling a hole into a formation using the drill bit;
    removing the drill bit from the receiving cavity;
    inserting a mine roof bolt having the square-shaped end into the receiving cavity; and
    installing the mine roof bolt into the formation by inserting the mine roof bolt into the hole.

11. The method of claim 1, wherein no separate insert, insertable into the receiving cavity, is required for the drill chuck to receive the square-shaped end and to receive the hex-shaped end.

12. The method of claim 1, wherein the drill chuck is additionally secured in the chuck cavity by at least one seal positioned in the chuck cavity.

13. The method of claim 12, wherein the drive further comprises a thrust bearing positioned in the chuck cavity, wherein the thrust bearing engages the drill chuck to secure the drill chuck in the chuck cavity.

14. The method of claim 13, wherein the thrust bearing co-acts with a portion of the chuck near a proximal end of the chuck and the at least one roller or ball bearing co-acts with a portion of the chuck that is closer to a distal end of the chuck than the portion of the chuck which co-acts with the thrust bearing.

15. The method of claim 1, wherein the drill further comprises a motor, the monolithic piece further comprises an engagement portion for connection to the motor, and the motor rotates the drill chuck in the chuck cavity.

16. The method of claim 1, wherein the bit having the hex-shaped end comprises aluminum and/or steel.

17. The method of claim 1, further comprising a suction housing including at least one suction port extending through the suction housing and connecting with the chuck cavity.

18. The method of claim 17, wherein the chuck includes at least one suction opening that extends between the suction port in the suction housing and the receiving cavity.

* * * * *

UNITED STATES PATENT AND TRADEMARK OFFICE
CERTIFICATE OF CORRECTION

PATENT NO. : 11,090,733 B2  
APPLICATION NO. : 16/150793  
DATED : August 17, 2021  
INVENTOR(S) : George Morrell et al.

Page 1 of 1

It is certified that error appears in the above-identified patent and that said Letters Patent is hereby corrected as shown below:

In the Claims

Column 5, Line 57, Claim 4, delete "claim 1," and insert -- claim 3, --

Column 6, Line 36, Claim 11, delete "claim 1," and insert -- claim 10, --

Column 6, Line 40, Claim 12, delete "claim 1," and insert -- claim 10, --

Column 6, Line 53, Claim 15, delete "claim 1," and insert -- claim 10, --

Column 6, Line 57, Claim 16, delete "claim 1," and insert -- claim 10, --

Column 6, Line 59, Claim 17, delete "claim 1," and insert -- claim 10, --

Signed and Sealed this  
Fourth Day of January, 2022

Drew Hirshfeld  
*Performing the Functions and Duties of the  
Under Secretary of Commerce for Intellectual Property and  
Director of the United States Patent and Trademark Office*